(12) United States Patent  
Carruthers et al.

(10) Patent No.: US 9,188,699 B2  
(45) Date of Patent: Nov. 17, 2015

(54) BASIN-TO RESERVOIR MODELING

(71) Applicant: Landmark Graphics Corporation, Houston, TX (US)

(72) Inventors: Daniel James Carruthers, Ottawa (CA); Jeffrey Marc Yarus, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 14/368,363

(22) PCT Filed: Oct. 15, 2013

(86) PCT No.: PCT/US2013/065063  
§ 371 (c)(1),  
(2) Date: Jun. 24, 2014

(87) PCT Pub. No.: WO2014/185950  
PCT Pub. Date: Nov. 20, 2014

(65) Prior Publication Data  
US 2015/0205001 A1 Jul. 23, 2015

Related U.S. Application Data

(60) Provisional application No. 61/823,607, filed on May 15, 2013.

(51) Int. Cl.  
*G06F 7/60* (2006.01)  
*G06F 17/10* (2006.01)  
*G01V 99/00* (2009.01)

(52) U.S. Cl.  
CPC ............... *G01V 99/005* (2013.01); *G06F 17/10* (2013.01)

(58) Field of Classification Search  
CPC ............................. G01V 99/005; G06F 17/10  
USPC .............................................................. 703/2  
See application file for complete search history.

(56) References Cited

U.S. PATENT DOCUMENTS

| | | | |
|---|---|---|---|
| 2007/0219724 A1* | 9/2007 | Li et al. ............................ | 702/12 |
| 2009/0204377 A1* | 8/2009 | Van Wagoner et al. ............ | 703/9 |
| 2009/0248312 A1* | 10/2009 | Hsu et al. ......................... | 702/15 |
| 2010/0206559 A1* | 8/2010 | Sequeira et al. ............ | 166/250.15 |
| 2011/0141851 A1* | 6/2011 | Kacewicz et al. ................ | 367/73 |

OTHER PUBLICATIONS

Commissioner, The International Search Report and the Written Opinion of the International Searching Authority, PCT/US/2013/065063, Feb. 18, 2014, 10 pages, ISA/KR.

* cited by examiner

*Primary Examiner* — Dwin M Craig  
(74) *Attorney, Agent, or Firm* — Crain, Caton & James; John Wustenberg

(57) ABSTRACT

Systems and methods for basin to reservoir modeling to identify any hi-grade drilling targets based on the linking of static and dynamic reservoir rock and fluid properties. Static, present-day, reservoir and field scale description grids or unstructured meshes are transformed into dynamic (through time) simulation grids or unstructured meshes that can subsequently be used for input to dynamic calculators. Basin modeling may be performed at the reservoir scale, providing a link between present-day and the historical process that acted on the rocks and fluids.

20 Claims, 4 Drawing Sheets

BASIN-TO RESERVOIR MODELING

CROSS-REFERENCE TO RELATED APPLICATIONS

This application claims the priority of PCT Patent Application No. PCT/US2013/65063, filed on Oct. 15, 2013, which is incorporated herein by reference. PCT Patent Application No. PCT/US2013/65063 claims the priority of U.S. Patent Application Ser. No. 61/823,607, filed on May 15, 2013, which is incorporated herein by reference.

STATEMENT REGARDING FEDERALLY SPONSORED RESEARCH

Not applicable.

FIELD OF THE DISCLOSURE

The present disclosure generally relates to basin-to-reservoir modeling. In particular, the present disclosure relates to systems and methods for generation of a basin-to-reservoir model having the application of dynamic, basin modeling principles to static or dynamic reservoir simulation grids.

BACKGROUND

Basin modeling concerns processes acting on rocks and fluids during the development of a sedimentary basin, including, inter alia, the simulations of sedimentation, burial, erosion, uplift, thermal properties, pressure properties, and diagenesis prediction. These simulations are generally applied to the entire basin or to large portions of it. Reservoir modeling concerns the present-day description of the rock and fluid properties in the subsurface in a localized area, with no means to calculate or describe the means by which the reservoir arrived at this state.

In the past, basin modeling and reservoir modeling have been two distinct disciplines. Among the shortcomings has been that basin models cannot be executed at the typical resolution required by reservoir models.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
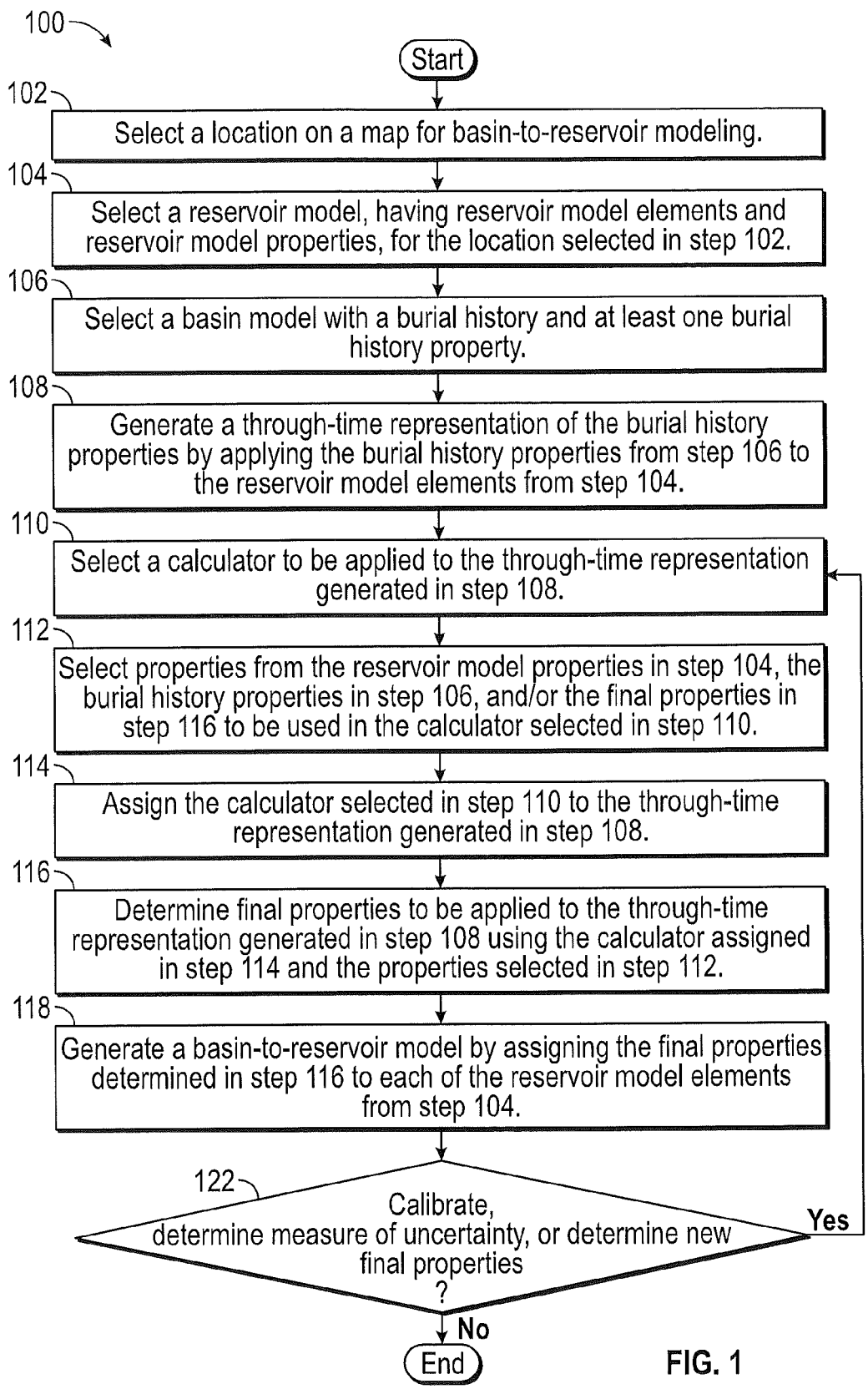
FIG. 1 is a flow chart illustrating one embodiment of a method for implementing the present disclosure.

The present disclosure therefore, overcomes one or more deficiencies in the prior art by providing systems and methods for generation of a basin-to-reservoir model having the application of dynamic, basin modeling principles to static or dynamic reservoir simulation grids In one embodiment the present disclosure includes a method for generating a basin-to-reservoir model, comprising: a) generating a through-time representation of at least one burial history property for a basin model by applying the at least one burial history property to reservoir model elements of a reservoir model using a computer system; b) selecting a property from at least one of reservoir model properties of the reservoir model, the at least one burial history property, and a final property; c) assigning a calculator to the through-time representation, wherein the calculator represents an algorithm for determination of the final property; d) determining the final property to be applied to the through-time representation using the calculator and the selected property; and e) generating the basin-to-reservoir model by assigning the final property to the reservoir model elements.

In another embodiment, the present disclosure includes a non-transitory program carrier device tangibly carrying computer executable instructions for generating a basin-to-reservoir model, the instructions being executable to implement: a) generating a through-time representation of at least one burial history property for a basin model by applying the at least one burial history property to reservoir model elements of a reservoir model; b) selecting a property from at least one of reservoir model properties of the reservoir model, the at least one burial history property, and a final property; c) assigning a calculator to the through-time representation, wherein the calculator represents an algorithm for determination of the final property; d) determining the final property to be applied to the through-time representation using the calculator and the selected property; and e) generating the basin-to-reservoir model by assigning the final property to the reservoir model elements.

In yet another embodiment, the present disclosure includes a non-transitory program carrier device tangibly carrying computer executable instructions for generating a basin-to-reservoir model, the instructions being executable to implement: a) generating a through-time representation of at least one burial history property for a basin model; b) selecting a property from at least one of reservoir model properties of the reservoir model, the at least one burial history property, and a final property; c) assigning a calculator to the through-time representation, wherein the calculator represents an algorithm for determination of the final property; d) determining the final property to be applied to the through-time representation using the calculator and the selected property; and e) generating the basin-to-reservoir model by assigning the final property to reservoir model elements of a reservoir model.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the present description refers to the oil and gas industry, it is not limited thereto and may also be applied in other industries to achieve similar results.

Method Description

Referring now to FIG. 1, a flow chart of a method 100 for implementing the present disclosure is illustrated. The method 100 transforms static, present-day, reservoir and field scale description grids or meshes into dynamic (through time) simulation grids or meshes that can be used for input to dynamic calculators in a simulation, and performs basin modeling at the reservoir scale. Thus, by correlating the basin model to the elements of the reservoir model and by mapping the two together, the output from a basin model (e.g. pressure, temperature, and stress geohistory) may be applied to the reservoir model. In this manner, a link is provided between the present and the historical process that acted on the rocks and fluids.

Figure 4:
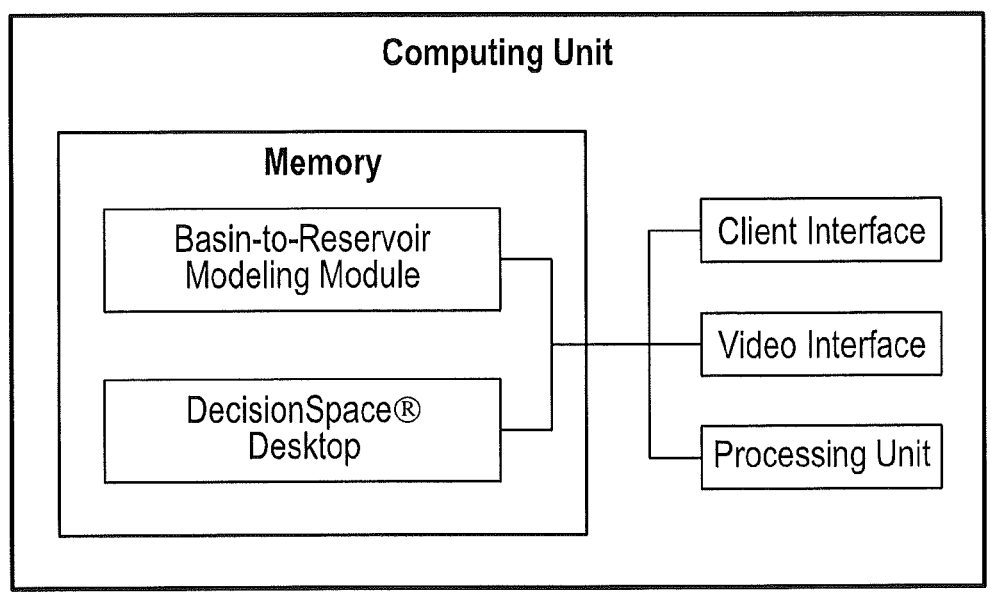
FIG. 4 is a block diagram illustrating one embodiment of a computer system for implementing the present disclosure.

In step 102, a location on a map is manually selected for basin to reservoir modeling using the client interface and/or the video interface described further in reference to FIG. 4 and techniques well known in the art.

Figure 2:
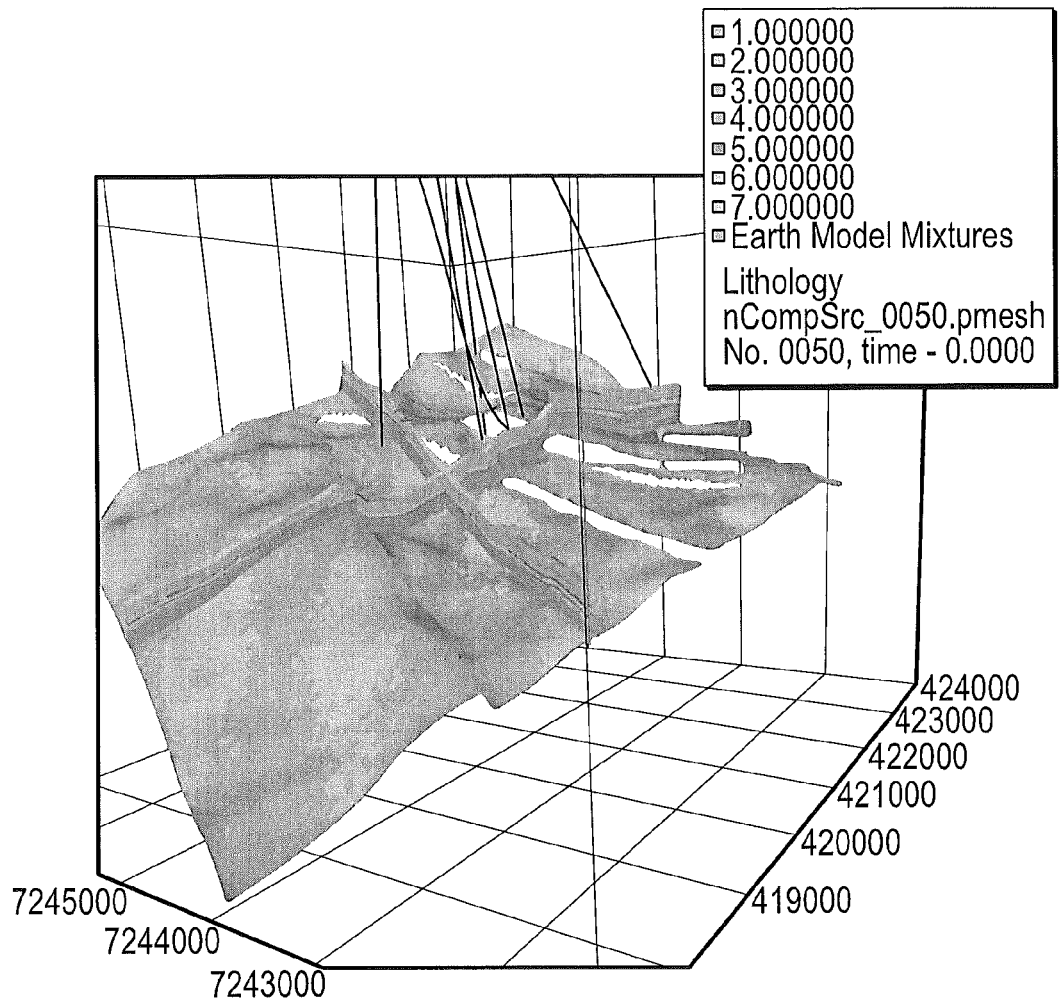
FIG. 2 is a display illustrating a typical reservoir model, which may be selected in step 104 of FIG. 1.

In step 104, a reservoir model, having reservoir model elements and reservoir model properties, is selected for the location selected in step 102 either automatically, based on proximity and/or other characteristics, or manually, using the client interface and/or the video interface described further in reference to FIG. 4 and techniques well known in the art. Reservoir model properties may include static properties such as oil and gas generation, adsorption, and in-situ reactions. The elements of the reservoir model may be irregular, may be a mesh or three-dimensional cells, may be tessellations, or volumes, and/or could be defined by an irregular unstructured grid. In FIG. 2, a typical reservoir model is illustrated. The rock types are shown in a legend and depicted for the specific layer identified.

In step 106, a basin model with a burial history and with burial history properties is selected automatically, based on proximity and/or other characteristics, or manually, using the client interface and/or the video interface described further in reference to FIG. 4 and techniques well known in the art. The basin model, sometimes referenced as a geohistory, may have associated source properties and variables for a point, an area, or a volume, depending on whether the basin model is one-dimensional, two-dimensional or three-dimensional, respectively, and is at least proximal, i.e. overlapping, encompassing or sufficiently close to provide a reasonable burial history, to the reservoir model selected in step 104. The basin model pertains to a time in the past and to a recent time (basin output). As can be appreciated, the basin model, which may cover an area as large as a part of a state, may be substantially larger than the reservoir model selected in step 104, which may be as small as a few square kilometers, or may match precisely the contours of the reservoir model selected in step 104. The basin model includes dynamic properties, such as the total of the geological events that occurred in the associated area, with a proper order implied from the history from beginning to end. This includes the identification of geological events that occurred in the associated area and the associated sequence.

Figure 3:
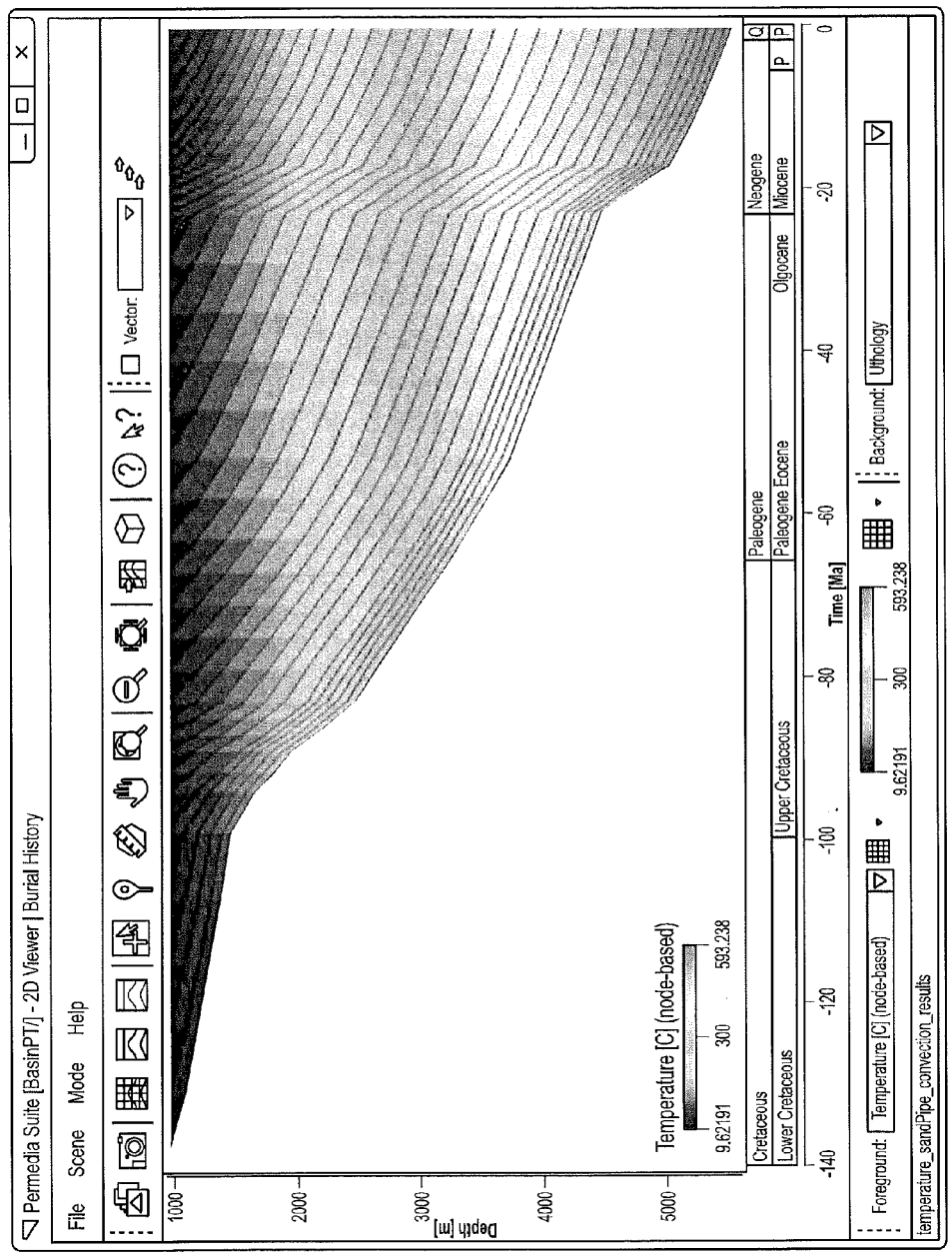
FIG. 3 is a display illustrating a typical basin model with a burial history, which may be selected in step 106 of FIG. 1.

In step 108, a through-time representation of one or more burial history properties is generated by applying the burial history properties from step 106 to the reservoir model elements from step 104. This may be accomplished by spatially mapping the basin model selected in step 106 at its basin output. Dynamic effective stress, temperature and other properties are applied to the reservoir elements, generating a through-time representation of the rock and fluid properties at the reservoir. In FIG. 3, a typical basin model with a burial history is illustrated. Temperature (through time) is shown, but many other properties are also calculated, and can be displayed (pressure, effective stress, etc.). Collectively, these dynamic properties constitute the burial history specific to the reservoir at hand.

In step 110, a calculator to be applied to the through-time representation generated in step 108 is automatically selected from a list of calculators based on predetermined criteria, such as identification of particular properties for review or for further processing in the basin-to-reservoir model, or, alternatively, may be manually selected for specific user-desired properties from the list of calculators using the client interface and/or the video interface described further in reference to FIG. 4. As is understood in the art, a calculator is a formula that requires the input of a source property to permit estimation of various static fluid properties or other properties. A calculator may be used to determine rock properties, geomechanical, fluid pressure-volume-temperature properties, and other properties requiring inputs from a basin model.

In step 112, the property or properties for use in the calculator selected in step 110 are automatically selected as required for input to the calculator selected in step 110 from the reservoir model properties in step 102, the burial history properties in step 106, and/or the final properties in step 116, or, alternatively, may be manually selected for the calculator selected in step 110 from the reservoir model properties in step 102, the burial history properties in step 106, and/or the final properties in step 116 using the client interface and/or the video interface described further in reference to FIG. 4.

In step 114, the calculator selected in step 110 is assigned to the through-time representation generated in step 108. In particular, the calculator selected in step 110 may be assigned to elements of the through-time representation generated in step 108.

In step 116, final properties to be applied to the through-time representation generated in step 108, in particular to the elements of the through-time representation, are determined using the calculator assigned in step 114 and the properties selected in step 112.

In step 118, a basin-to-reservoir model is generated by assigning the final properties determined in step 116 to each of the elements of the reservoir model from step 104. This may provide a basis for calibration, for determining a measure of uncertainty in the case of multiple iterations, or for obtaining new final properties. The final properties determined in step 116 may be compared against the reservoir model properties of the reservoir model selected in step 104 for calibration. The measure of uncertainty may be derived from multiple iterations, which provides an error variance.

In step 122, the method 100 determines whether to calibrate, determine a measure of uncertainty or determine new final properties based on the basin-to-reservoir model generated in step 118 and criteria and/or processes, which may be automatically performed based on user-provided criteria, or, alternatively, may be manually selected for a desired output using the client interface and/or the video interface described further in reference to FIG. 4. If the decision is made to calibrate, determine a measure of uncertainty or determine new final properties, then the method 100 returns to step 110 to select another calculator for calibration, for determination of the measure of uncertainty, or for determination of new final properties. If the decision is not to calibrate, determine a measure of uncertainty and determine new final properties, then the method 100 ends.

The method 100 thus, provides for generation of a basin-to-reservoir model incorporating the static elements of the reservoir model selected in step 104 and the dynamic elements of the basin model selected in step 106. The elements of the basin-to-reservoir model, which contain both static properties, such as lithology, rock-type, and petro-facies, and dynamic attributes, such as endpoint calibration properties, may be used to calculate parameters dependent on both.

Thus, with a fluid description, a static reservoir model and a dynamic basin model, a reservoir model with static and dynamic properties may be generated, which can then be used for various purposes, including well planning and production simulation.

System Description

The present disclosure may be implemented through a computer-executable program of instructions, such as program modules, generally referred to software applications or application programs executed by a computer. The software may include, for example, routines, programs, objects, components, and data structures that perform particular tasks or implement particular abstract data types. The software forms an interface to allow a computer to react according to a source of input. DecisionSpace® Desktop, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 4, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIG. 1. The memory therefore, includes a basin-to-reservoir modeling module, which enables the method described in reference to FIG. 1. In particular, DecisionSpace® Desktop may be used as an interface application to perform steps 102 and 104 in FIG. 1. The basin-to-reservoir modeling system module performs the remainder of the steps in FIG. 1. Although DecisionSpace® Desktop may be used as the interface application, other interface applications may be used, instead, or the basin-to-reservoir modeling system module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing wilt. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for generating a basin-to-reservoir model, comprising:
    a) generating a through-time representation of at least one burial history property for a basin model by applying the at least one burial history property to reservoir model elements of a reservoir model using a computer system;
    b) selecting a property from at least one of reservoir model properties of the reservoir model, the at least one burial history property, and a final property;
    c) assigning a calculator to the through-time representation, wherein the calculator represents an algorithm for determination of the final property;
    d) determining the final property to be applied to the through-time representation using the calculator and the selected property; and
    e) generating the basin-to-reservoir model by assigning the final property to the reservoir model elements.

2. The method of claim 1, further comprising repeating steps b)-e) to calibrate the basin-to-reservoir model, to determine a measure of uncertainty of the basin-to-reservoir model, or to determine a new final property.

3. The method of claim 1, further comprising:
    selecting a location on a map for the basin-to-reservoir model.

4. The method of claim 3, further comprising:
    selecting the reservoir model based on the location on the map.

5. The method of claim 4, further comprising:
    selecting the basin model based on the location on the map.

6. The method of claim 2, wherein the calibration of the basin-to-reservoir model comprises comparing the final property to the reservoir model properties.

7. The method of claim 2, wherein to determine a measure of uncertainty of the basin-to-reservoir model comprises determining an error variance from multiple iterations of repeating steps b)-e).

8. The method of claim 1, wherein generating the through-time representation of the burial history properties for the basin model comprises spatially mapping the basin model at a basin output.

9. A non-transitory program carrier device tangibly carrying computer executable instructions for generating a basin-to-reservoir model, the instructions being executable to implement:
    a) generating a through-time representation of at least one burial history property for a basin model by applying the at least one burial history property to reservoir model elements of a reservoir model;
    b) selecting a property from at least one of reservoir model properties of the reservoir model, the at least one burial history property, and a final property;
    c) assigning a calculator to the through-time representation, wherein the calculator represents an algorithm for determination of the final property;
    d) determining the final property to be applied to the through-time representation using the calculator and the selected property; and
    e) generating the basin-to-reservoir model by assigning the final property to the reservoir model elements.

10. The program carrier device of claim 9, further comprising repeating steps b)-e) to calibrate the basin-to-reservoir model, to determine a measure of uncertainty of the basin-to-reservoir model, or to determine a new final property.

11. The program carrier device of claim 9, further comprising:
    selecting a location on a map for the basin-to-reservoir model.

12. The program carrier device of claim 11, further comprising:
    selecting the reservoir model based on the location on the map.

13. The program carrier device of claim 12, further comprising:
    selecting the basin model based on the location on the map.

14. The program carrier device of claim 10, wherein the calibration of the basin-to-reservoir model comprises comparing the final property to the reservoir model properties.

15. The program carrier device of claim 10, wherein to determine a measure of uncertainty of the basin-to-reservoir model comprises determining an error variance from multiple iterations of repeating steps b)-e).

16. The program carrier device of claim 9, wherein generating the through-time representation of the burial history properties for the basin model comprises spatially mapping the basin model at a basin output.

17. A non-transitory program carrier device tangibly carrying computer executable instructions for generating a basin-to-reservoir model, the instructions being executable to implement:
    a) generating a through-time representation of at least one burial history property for a basin model
    b) selecting a property from at least one of reservoir model properties of the reservoir model, the at least one burial history property, and a final property;
    c) assigning a calculator to the through-time representation, wherein the calculator represents an algorithm for determination of the final property;
    d) determining the final property to be applied to the through-time representation using the calculator and the selected property; and
    e) generating the basin-to-reservoir model by assigning the final property to reservoir model elements of a reservoir model.

18. The program carrier device of claim 17, further comprising repeating steps b)-e) to calibrate the basin-to-reservoir model, to determine a measure of uncertainty of the basin-to-reservoir model, or to determine a new final property.

19. The program carrier device of claim 18, wherein the calibration of the basin-to-reservoir model comprises comparing the final property to the reservoir model properties.

20. The program carrier device of claim 18, wherein the determination of a measure of uncertainty of the basin-to-reservoir model comprises determining an error variance from multiple iterations of repeating steps b)-e).

* * * * *